United States Patent [19]

Madsen

[11] Patent Number: 4,722,460
[45] Date of Patent: Feb. 2, 1988

[54] UNDERWATER GRANULAR ALGAECIDE DISPENSER

[76] Inventor: Christopher P. Madsen, 3 Willowglen Pl., Santa Barbara, Calif. 93105

[21] Appl. No.: 898,412

[22] Filed: Aug. 21, 1986

[51] Int. Cl.⁴ ............................................... B67D 5/64
[52] U.S. Cl. ..................................... 222/174; 222/517; 222/191; 251/308; 239/578
[58] Field of Search ............... 222/174, 473, 556, 517, 222/191; 251/213, 279, 294, 308, 305; 24/115 H, 115 K, 128, 129 R, 129 A, 115 R; 239/578; 294/19.1, 24

[56] References Cited

U.S. PATENT DOCUMENTS

| | | | |
|---|---|---|---|
| 1,289,505 | 4/1918 | Mariner | 222/174 |
| 1,340,406 | 7/1920 | Reid | 222/174 |
| 1,857,477 | 5/1932 | Ritter | 251/308 |
| 1,960,738 | 5/1934 | Giezentanner | 222/174 |
| 2,770,398 | 11/1956 | Sauerman | 222/517 |
| 3,081,792 | 3/1963 | Hansen | 251/308 |
| 3,163,959 | 1/1965 | Hollar | 222/174 |
| 3,272,399 | 9/1966 | Dight | 222/517 |
| 4,262,822 | 3/1981 | Corte | 222/473 |
| 4,566,313 | 1/1986 | Monten | 222/174 |

FOREIGN PATENT DOCUMENTS 2147937 5/1985 United Kingdom ............. 24/115 H

Primary Examiner—Joseph J. Rolla
Assistant Examiner—Kenneth Noland

[57] ABSTRACT

A granular algaecide dispensing device for dispensing granular algaecide in controlled amounts and in specific locations, such as on algae spots, in a fluid vessel, such as a swimming pool, from a position above the surface of said fluid vessel. The device consists of a tubular chamber which may be filled with a granular algaecide, and has a valve assembly at one end and an end cap and handle at the opposite end. The device is readily removably mounted at the receiving end of any standard swimming pool pole by means of the handle connector. An operator at the opposite end of the pole may position the device at any desired location in the fluid vessel and, by pulling a control line which is attached to the valve assembly and which runs the length of the pole, the valve will be forced to open, and the granular algaecide will be steadily released from the dispenser onto the desired location until the control line is released.

9 Claims, 4 Drawing Figures

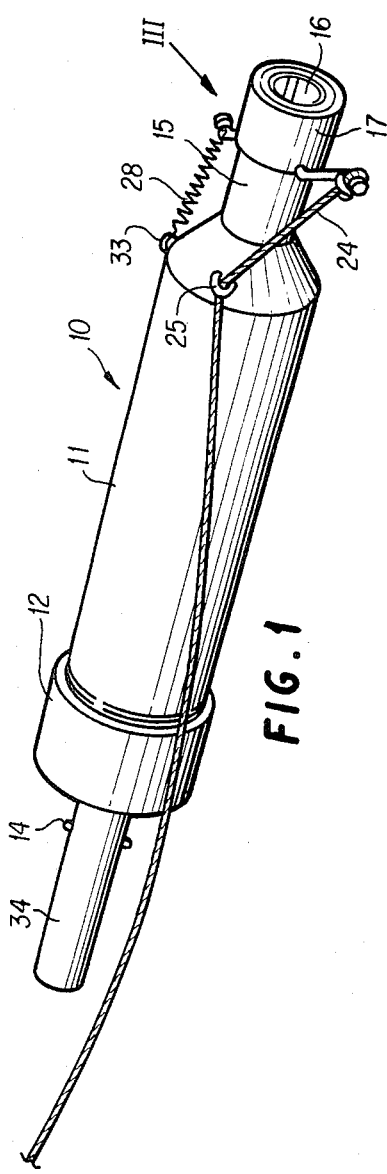
FIG. 1
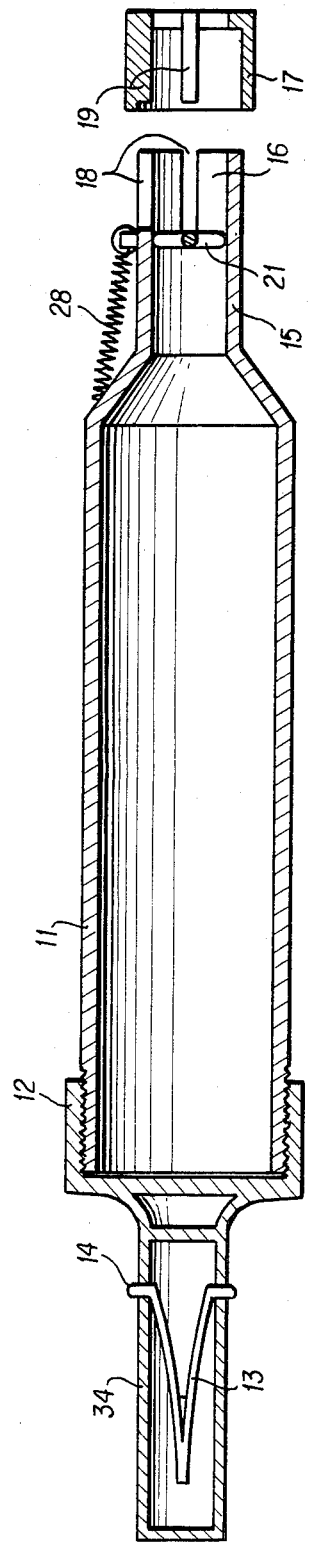
FIG. 2
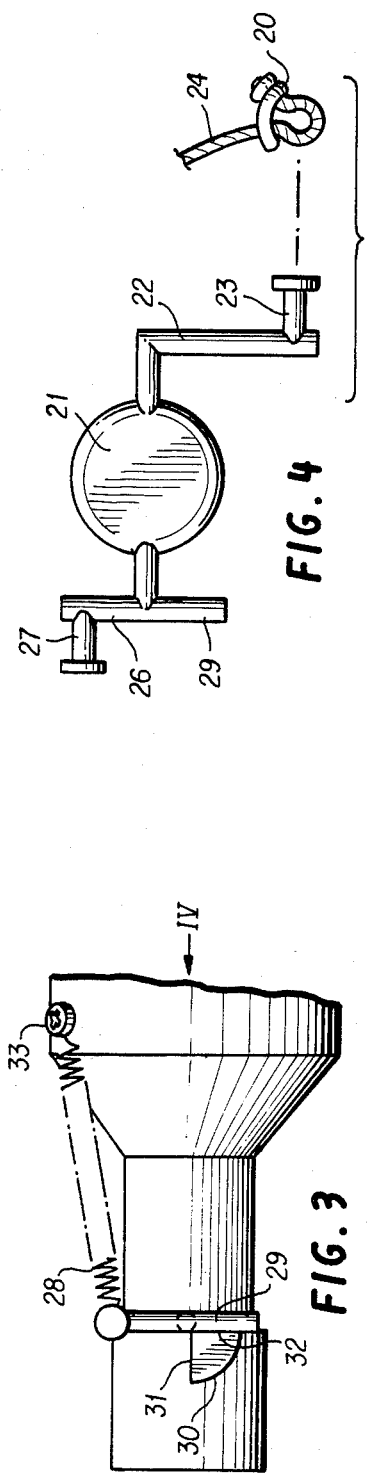
FIG. 3
FIG. 4

UNDERWATER GRANULAR ALGAECIDE DISPENSER

BACKGROUND OF THE INVENTION

The invention relates to a device for treating algae in fluid vessels such as swimming pools, and more specifically to a device which an operator, above the surface of the water, can use to dispense controlled amounts of granular algaecide at specific locations on the floor of said fluid vessel.

Several types of algae commonly found in swimming pools grow in the form of round leathery clumps on the pool floor, and range in size from small spots to clumps the size of a silver dollar. One of the the most commonly used and effective methods for killing this type of algae is with the use of a granular algaecide. When this slow disolving granular algaecide is positioned directly on top of an algae spot and allowed to remain there until desolved, it "super-chlorinates" and kills the algae.

Heretofore the method for applying granular algaecide to algae spots has been to sprinkle the granular algaecide on the surface of the water directly above an algae spot, allowing it to drift down and settle on the algae spot. However, since the depth of an average pool ranges from three to nine feet, by the time the granular algaecide settles to the bottom, most of it has spread out, and very little of the granular algaecide ends up landing on the targeted algae spot. As a result, the algae often times is not covered with enough granular algaecide to kill it, and at the same time the person treating the algae has wasted a great deal of money, since approximately 75% of this very costly granular algaecide never even landed on top of the targeted algae spot. The results of this method of application are even less satisfactory when treating algae spots that are not near the edge of the pool, since the person treating the algae must now throw the granular algaecide at the target algae spot.

One last disadvantage of this conventional method of application has to do with the health hazards associated with exposure to granular algaecides and the accompaning chemical dust. This extremely fine dust is formed from the break down of the algaecide granules, and is found in significant concentrations in any container of granular algaecide. The manufacturers of these granular algaecides strongly caution against skin and eye contact or breathing of this fine dust. However, when throwing or sprinkling granular algaecide it is virtually impossible to avoid contact with this very fine chemical dust which lingers in the air for prolonged periods of time.

SUMMARY OF THE PRESENT INVENTION

The present invention dramatically reduces the dificulty of positioning the granular algaecide directly on top of targeted algae spots. With the underwater granular algaecide dispenser affixed to the end of a standard swimming pool pole, the operator positions the end of the underwater granular algaecide dispenser directly on top of a targeted algae spot and, with a quick tug of the control line, a neat clean pile of granular algaecide will be released directly on top of the targeted algae spot. In this manner the operator may move the underwater granular algaecide dispenser quickly from one algae spot to another, leaving the algea spots completely covered with granular algaecide, and at the same time almost none of the granular algaecide is wasted as a result of missing targeted algae spots and setting in areas of the pool floor where no algae is present.

The present invention also greatly reduces the health hazards associated with the grandular algaecide by reducing the possibility of exposure to the fine chemical dust. In using the underwater granular algaecide dispenser, the only time any of the dust from the granular algaecide can be stirred up into the air is when the granular algaecide is being poured from its original container into the underwater grandular algaecide dispenser. Obviously if this transfer is done carefully, the amount of granular algaecide dust stirred up into the air during use with the underwater granular algaecide dispenser is only a small fraction of the amount of dust released into the air using the present conventional method of sprinkling or throwing the algaecide thru the air.

In review the underwater granular algaecide dispenser:

(1) Reduces health hazards associated with exposure to granular algaecide dust, (2) Reduces the cost of algae treatment by eliminating needless waste of the costly granular algaecide, (3) Increases the effectiveness of algae treatments by making it easy to completely cover algea spots with ample amounts of granular algaecide, (4) Reduces the amount of time required to treat an algae infestation.

Further more the underwater granular algaecide dispenser is of a simple plastic construction, is inexpensive to manufacture, and is capable of mass production techniques.

Further objects and advantages of the invention will become apparent from a consideration of the drawings and ensuing description of it.

DESCRIPTION OF THE DRAWINGS

FIG. 1 is a perspective view of the underwater granular algaecide dispenser completely detached from a standard swimming pool pole. Only a partial view of the standard swimming pool pole is given, showing only the receiving end of the pole. The control line of the underwater granular algaecide dispenser is relaxed and hence the valve is in the closed position.

FIG. 2 is a partial cross-sectional view of the underwater granular algaecide dispenser in which the retaining ring has been slipped off the neck for clearer illustrative purposes.

FIG. 3 is a partial perspective view of the components of the underwater granular algaecide dispenser indicated by the roman numeral three in FIG. 1.

FIG. 4 is a perspective view of the valve with control line and bridle detached.

DRAWING REFERENCE NUMERALS

10: underwater granular algaecide dispenser
11: body
12: end cap
13: lock
14: lock pin
15: neck
16: neck opening
17: retaining ring
18: slots
19: guide tabs
20: bridle
21: valve
22: actuator arm 23: actuator tang
24: control line
25: control line guide
26: spring arm
27: spring tang
28: spring
29: spring arm base
30: stop
31: open stop face
32: closed stop face
33: spring anchor
34: handle conector
35: swimming pool pole opening
36: swimming pool pole apeture
37: swimming pool pole recieving end
38: handle conector apeture
39: funnel
40: valve axis
41: bridle apeture

DETAILED DESCRIPTION OF THE PREFERED EMBODIMENT

Refering to FIG. 1, there is shown the underwater granular algaecide dispenser 10 which may be affixed to any standard swimming pool pole in the same conventional manner as with other pool tools, i.e. brushes, nets, vacuums etc. The lock 13 of FIG. 2 consists of a spring-biased, v-shaped piece of resilient, semi-rigid plastic material with a lock pin 14 at the end of each biasing member. The diameter of each lock pin 14 is slightly smaller than the diameter of both the handle conector apetures 38 and the swimming pool pole apetures 36. The lock 13 is held in place within the handle conector 34 by the two lock pins 14 which, because of the spring biased nature of the lock 13, normally extend thru the handle conector apetures 38. These lock pins 14 can be manually depressed radially inward within the handle conector 34, allowing the full length of the handle conector 34 to be slipped thru the swimming pool pole opening 35 of the swimming pool pole receiving end 37, at which point the tips of the lock pins 14 will pop out and extend thru the swimming pool pole apetures 36 thus firmly affixing the underwater granular algaecide dispenser 10 to the swimming pool pole recieving end 37.

As can be seen in FIG. 2 the handle conector 34 and end cap 12 are one continuous piece of molded plastic. The end cap 12 is affixed to the body 11 by means of a threaded conection—female threads within the end cap 12 and male threads at the end of the body 11. The body 11 and neck 15 are one continuous piece of molded plastic piping. The transition between the larger diameter body 11 and smaller diameter neck 15 is facilitated by a funnel shaped section of plastic 39. This funnel 39 ensures that virtually all of the granular algaecide will be dispensed when the valve 21 is left open. Three slots 18 are cut out of the plastic wall of the neck 15. The width of the slots 18 is slightly larger than the diameter of the valve axis 40. The two opposing slots 18 serve as channels thru which the valve axis 40 travels when installing the valve 21. The valve axis 40 is normally cradled at the bottom of these two slots 18.

The retaining ring 17 is a plastic sleeve which slides over the neck 15 and is sized such that, when frictionally engaged on the neck 15, it cannot slip off without manual intervention. The three plastic guide tabs 19 within the retaining ring are sized so that they may slide into the slots 18 of the neck 15, and are positioned such that there is only one possible position in which the retaining ring 17 may be installed on the neck 15. The retaining ring 17, in its normal position on the neck 15, butts up against the valve axis 40, thus preventing the valve axis 40 from traveling up and down the length of the slot 18 and limiting the valves 21 motion to one of rotation around its axis 40.

As best viewed in FIG. 2 and FIG. 3, the valve 21 is a single piece of molded rigid plastic which comprises both an axis 40, by which the valve 21 is held in position in the neck 15, and an actuator arm 22 and a spring arm 26 which facilitate the manual opening and automatic closing of the valve 21. The spring tang 27 is a perpendicular branch off of the spring arm 26. One end of a lightweight stainless steel spring 28 is attached to the spring tang 27. The other end of the spring 28 is attached to a point just beyond the juncture of the body 11 and the neck 15, where it is attached to the body 11 with the spring anchor 33—a plastic screw. When the valve 21 is in the closed position the influence of the stretched spring 28 cannot pull the spring arm 26 towards the spring anchor 33 because the motion of the spring arm base 29, which pivots in the opposite direction of the spring arm 26, is haulted by hitting against the closed stop face 32. The stop 30 is a molded plastic component of the retaining ring 17, which protruds far enough out beyond the outer circumference of the retaining ring 17 so as to become an obstacle in the path of the spring arm 26 and spring arm base 29 during valve 21 rotation When the valve 21 reaches the closed position, the spring arm base 29 hits the closed stop face 32 of the stop 30 and the valve 21 can rotate no further. When rotated in the opposite direction, as soon as the valve 21 reaches the open position, the spring arm 26 hits the open stop face 31 of the stop 30 and the valve can rotate no further. When not in use, the influence of the spring 28 on the spring arm 26 holds the valve 21 in the closed position.

The actuation tang 23 is a perpendicular branch off of the actuation arm 22. The control line 24 is attached to the actuation tang 23 by means of the bridle 20. The bridle 20 is a bow shaped strip of plastic with one apeture 41 at either end. The control line 24 is threaded thru either bridle apeture 41 from the convex side of the bridle 20 towards the concave side. The control line 24 is then threaded back up thru the opposite bridle apeture 41 from the concave side of the bridle 20 towards the convex side. Once the end of the control line 24 is pulled thru this second bridle apeture 41, the tip of the control line 24 is heated with a flame causing its diameter to expand slightly and preventing it from being pulled back thru the bridle apeture 41. The loop which has been formed on the concave side of the bridle 20 is slipped over the actuation tang 23. When the control line 24 is pulled, the loop closes down and the control line 24 becomes securely affixed to the actuation tang 23. In this way the bridle 20 eliminates the need for a bulky, cumbersome knot.

As best viewed in FIG. 1, the free end of the control line 24 is threaded thru the control line guide 25. The control line guide 25 is a plastic screw having a flat circular head in the middle of which is an apeture slightly larger in diameter than the diameter of the control line 24. The control line guide 25 is located in such a position on the funnel 39 so that when the control line 24 is pulled, the direction which the actuation arm 22 is drawn to results in the least amount of effort being required to open the valve 21. The remainder of the control line 21 runs along the full length of the standard swimming pool pole and is grasped by the operator from whatever position along the pole he wishes to manipulate the underwater granular algaecide dispenser 10.

It is understood, of course, that the foregoing disclosure relates to only prefered embodiments of the invention and that it is intended to cover any changes and modifications of the invention herein chosen for the purpose of disclosure which do not constitute departures from the spirit and scope of the invention.

OPERATION OF THE INVENTION

In the actual operation of the invention the operator removes the end cap 12 from the body 11, which screws off in a conventional manner, and pours a desired amount of granular algaecide from its original container directly into the body 11. Once the body 11 has been filled with the desired amount of granular algaecide, the end cap 12 is re-attached to the body 11 by screwing it on in a conventional manner, and the underwater granular algaecide dispenser is mounted at the receiving end of any standard swimming pool pole 37. This mounting is accomplished by sliding the full length of the handle conector 34 thru the swimming pool pole opening 35 and into the recieving end of the swimming pool pole 37. Because the lock pins 14 of the spring-biased lock 13 protrude thru the handle conector 34 and extend beyond the outer circumference of the handle conector 34, they must be manually depressed radially inward to a position within the outer circumference of the handle conector 34 in order to facilitate sliding the full length of the handle conector 34 thru the swimming pool pole opening 35 and into the swimming pool pole receiving end 37. When the handle conector 34 is fully inserted into the swimming pool pole recieving end 37, the lock pins 14 which are positioned in the handle conector 34 are alligned with the apertures in the swimming pool pole receiving end 37, at which point the spring biasing nature of the lock 13 forces the ends of the lock pins 14 to pop thru the swimming pool pole apetures 36, thereby securely mounting the underwater granular algaecide dispenser 10 to the swimming pool pole recieving end 37.

The control line 24 is extended along the length of the standard swimming pool pole. The operator grasps the standard swimming pool pole and the control line 24 at an appropriate point such that the underwater granular algaecide dispenser is extended far enough away from the operator as to enable him to position the neck opening 16 directly on top of the algae spot which is to be treated. A standard swimming pool pole telescopes out to a length of fifteen feet, allowing an operator to treat algae spots up to fifteen feet away from the rim of the pool. The operator lowers the underwater granular algaecide dispenser 10 underwater, and positions it such that the neck opening 16 is directly on top of the algae spot which is to be treated.

As the operator pulls the control line 24, the actuation arm 22 is drawn towards the control line guide 25 causing the valve 21 to rotate to the open position. As soon as the valve 21 has rotated ninety degrees to the fully open position, the spring arm 26 butts up against the open stop face 31 of the stop 30 thus stopping the valve 21 from rotating beyond the fully open position. As long as the valve 21 is held open by the control line 24, the grandular algaecide will continue to be dispensed thru the neck opening 16 onto the targeted algae spot. As the control line 24 is released the influence of the stretched spring 28 draws the spring arm 26 towards the spring anchor 33 thus causing the valve 21 to rotate to the closed position. As soon as the valve 21 has rotated to the fully closed position, the spring arm base 29 butts up against the closed stop face 32 thus stopping the valve 21 from rotating beyond the fully closed position. With the valve 21 in the fully closed position, none of the granular algaecide will be released from the underwater granular algaecide dispenser 10. In this manner, an operator may rapidly maneuver the underwater granular algaecide dispenser 10 from one algea spot to another and, with quick little tugs on the control line 24, completely cover each algae spot with a neat clean pile of granular algaecide.

The retaining ring 17 is sized to slip frictionally onto the neck 15. This allows for easy removal of the retaining ring 17 and facilitates the easy replacement of the valve 21 should breakage occur. The control line guide 25 and the spring anchor 33 are both plastic bolts having threaded stems so that they may be screwed into or unscrewed from the body 11 in a conventional manner to facilitate their easy replacement should breakage occur.

CONCLUSION AND SCOPE OF INVENTION

Thus the reader can see that the underwater granular algaecide dispenser 10 provides a highly reliable, durable, lightweight and economical device which will provide pool owners/operators, who must use a granular algaecide for the treatment of algae, with:

(1) Greatly reduced health hazards due to reduced exposure to the granular algaecide dust.

(2) Greatly reduced treatment cost due to the reduced waste of the costly algaecide by approximately 75%.

(3) Increased effectiveness of algae treatments as a result of the ability to completely cover targeted algae spots with ample amounts of granular algaecide.

(4) Great time savings as a result of the manner in which an operator may quickly and effeciently treat one algae spot after another.

What is claimed is:

1. In combination with a standard swimming pool pole, including a pair of apertures at a receiving end, and a granular algaecide dispensing device for dispensing controled amounts of granular algaecide underwater primarily but not soley for the purpose of killing algae, said dispensing device comprising:

a rigid tubular reservoir suited to storing a quantity of granular algaecide, said reservoir having first and second ends, said second end having an aperture large enough to easily facilitate the steady release of granular algaecide, a spring loaded plastic valve especially suited to the release of granular algaecide, positioned in said second end of said rigid tubular reservoir for controling the release of granular algaecide from said rigid tubular reservoir, and said spring biasing said valve about a pivot axis to assume a closed position when the dispensing device is not being manipulated by an operator, an actuating means for opening and closing said valve, a rigid end cap which is releasably secured to the first end of said rigid tubular reservoir, a tubular member releasably mounted to said standard swimming pool pole and coupled to the cap, two slots on opposing sides of said second end of said rigid tubular reservoir to serve as guide channels for said pivot axis of said valve and so that said valve may be removably mounted in said second end of said rigid tubular reservoir.

2. The invention of claim 1 wherein means attached to said second end of said rigid tubular reservoir and to the axis of said valve limit the rotational capacity of said valve to a maximum of ninety degrees thus preventing said valve from rotating beyond the fully open or fully closed positions.

3. The invention of claim 2 wherein said means attached to said second end of said rigid tubular reservoir and to the axis of said valve comprises a rigid plastic rod connected at its mid length, in a perpendicular manner, to said axis of said valve, and a protrusion from said second end of said rigid tubular reservoir which, by limiting the movement of said plastic rod of said valve axis, also limits the rotational capacity of said valve to a maximum of ninety degrees.

4. The invention of claim 3 wherein said protrusion may be removably mounted to said second end of said rigid tubular reservoir by a plastic sleeve to which said protrusion is attached, said plastic sleeve being frictionally sized to fit releasably over said second end of said rigid tubular reservoir.

5. The invention of claim 1 wherein, said valve axis may be held in place at the end of said slots by the leading edge of a plastic sleeve, said sleeve being frictionally sized to fit releasably over said second end of said rigid tubular reservoir, thus facilitating simple replacement of said valve in the event of breakage.

6. The invention of claim 1 wherein the peripheral edge of said valve is tapered to minimize the amount of surface area blocking the flow of the dispensing granular algaecide thus reducing the occurance of said granular algaecide clogging in said second end of said rigid tubular reservoir.

7. The invention of claim 1 wherein means attached to the end of a string facilitate the swift remval and or attachment of said string to an actuation arm, said actuation arm being connected to said valve axis, and without incorperating the use of bulky knots or other non compact means, and in such a way that said attached string is able to pivot around point of attachment on said actuation arm so as not to hinder the motion of said actuation arm when tension is applied to said string.

8. The invention of claim 7 wherein said means attached to the end of the string comprises a small bow shaped strip of plastic having an aperture at each end thru which one end of the string has been threaded, said end of said string later having been enlarged by heat or other means thus preventing said end of said string from being pulled back thru said aperture, and resulting in the formation of a compact adjustable loop, on the convex side of said bow shaped strip of plastic, that may be swiftly opened and closed allowing for swift attachment or removal from said actuation arm without incorperating the use of bulky knots or other known compact means, and in such a way that said attached string is able to pivot around point of attachment on said actuation arm.

9. The invention of claim 8 wherein said point of attachment on said actuation arm comprises a rigid plastic rod connected in a perpendicular manner to a point just before the terminating end of said actuation arm, such that said actuation arm prevents said string from slipping off of the attached end of said rigid plastic rod, and said rigid plastic rod having an enlarged terminating end to prevent said string from slipping off of said terminating end of said rigid plastic rod.

* * * * *